UNITED STATES PATENT OFFICE.

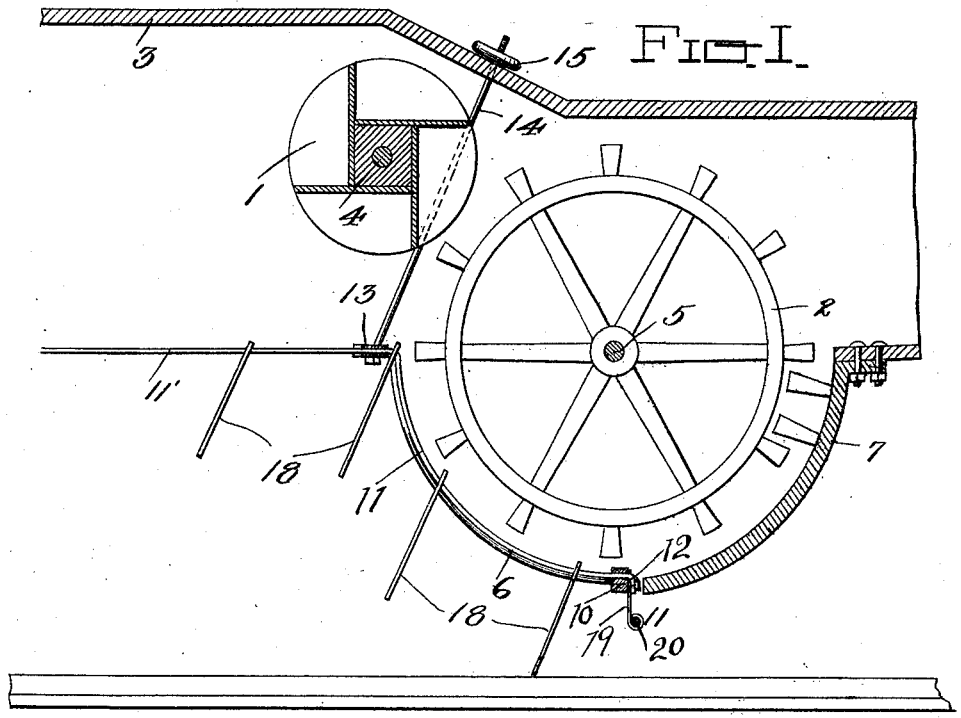
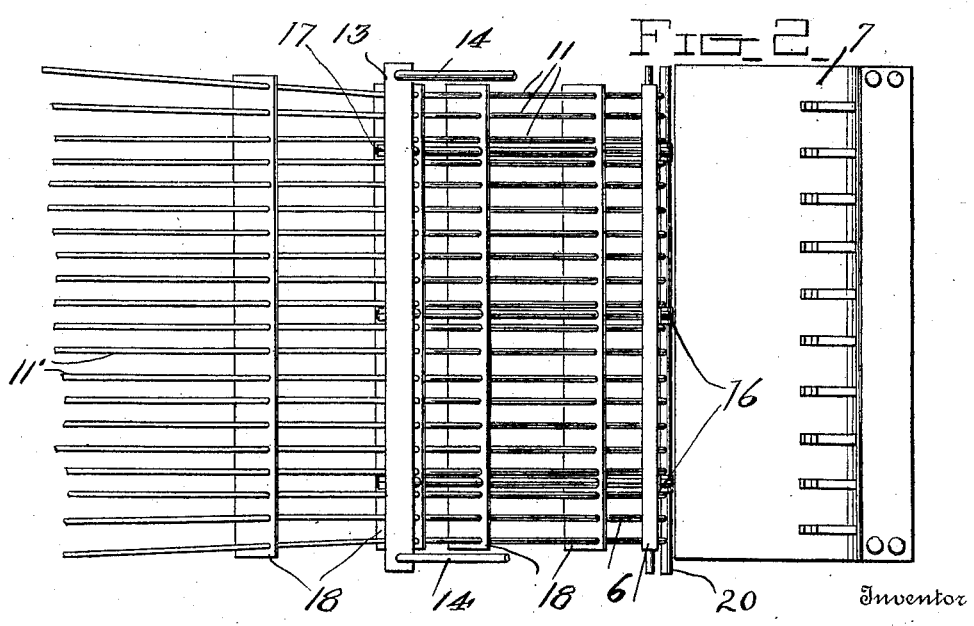

NICHOLAS COLGEN, OF ST. CHARLES, MINNESOTA.

SEPARATING-GRATE.

985,007.

Specification of Letters Patent.   Patented Feb. 21, 1911.

Application filed April 30, 1910.  Serial No. 558,747.

*To all whom it may concern:*

Be it known that I, NICHOLAS COLGEN, a citizen of the United States, residing at St. Charles, in the county of Winona and State of Minnesota, have invented certain new and useful Improvements in Separating-Grates, of which the following is a specification.

This invention relates to an improvement in separating grates for threshing machines and has for its primary object to provide a separating grate which will efficiently coöperate with the toothed cylinder of the machine in separating the grain from the straw or vines.

A further object of the present invention comprises the formation of the separating grate with a series of separate wire members, so that any of these members which may become damaged can be replaced by new ones, without dismantling the entire grate.

Further objects and advantages will appear from the following description with reference to the accompanying drawings wherein:—

Figure 1 is a view in longitudinal section of a portion of a threshing machine embodying my invention, Fig. 2 is a top plan view of my improved separating grate removed from the machine, showing the relative position between the grate and concave.

Referring to the accompanying drawing wherein like reference characters designate like parts throughout the different views the numeral 1 indicates a beater positioned adjacent to the toothed cylinder 2. Both of these members are of the usual construction and are suitably mounted within the body 3, by means of the rods 4 and 5, respectively, which serve as axles. The toothed cylinder 2 coöperates in separating the grain from the straw, with the grate 6 which is located below and substantially concentric to a section of the lower half of said cylinder. This grate comprises a plurality of separate and independent wires 11, one end of which passes through a transverse bar 10 which is secured by clips to the rod 20. The projecting ends of these wires are flanged or upset as at 12 so as to securely hold the same in position. It will be understood that I do not intend to entirely do away with the ordinary concave, but that this separating grate is located adjacent thereto. In the present instance the concave is indicated by the numeral 7, suitably secured to the machine.

The transverse bar 10, through which the wires 11 pass, is located adjacent to the lower or back end of the concave 7. The wires 11 which constitute the grate are curved so as to form a continuation of an arc, the center of which is a cylinder shaft 5, so that the curved portion of the wires are substantially concentric to a section of the cylinder 2. These wires extend concentrically to the cylinder to a point substantially parallel with or slightly above the shaft or axle 5 of the cylinder 2. At this point the wires 11 pass through bearings formed in the transverse bar 13, and extend in a longitudinal plane for a suitable distance, thereby forming a comb section or straw deck 11' for the straw after it has passed between the cylinder and concave and grate.

As has been stated heretofore, the grate is normally so positioned that it lies close to the path of the cylinder teeth. However, under certain conditions it may be advisable to either increase or decrease the space between the cylinder and grate, and in order to accomplish this, the grate is rendered capable of limited vertical adjustment due to the resiliency of the wire teeth 11. This adjustment is secured by fastening a pair of hanger rods 14 to the opposite ends of the bar 13. These rods 14 extend upwardly and pass through the frame of the machine, the projecting ends thereof being threaded to receive the nuts 15. By operating these nuts 15, it will be seen that the rods will be either raised or lowered, thus flexing the resilient wires 11 of the grate so as to increase or decrease the space between the cylinder and grate.

It will be seen that the portion of the grate concentric to the cylinder will be under considerable strain when the machine is in operation and to strengthen the grate as much as possible, reinforcing rods 16 are interposed at certain intervals between the wires 11, one end of these rods being made fast to the bar 10 while the opposite ends pass through the bar 13 and are secured in position by means of the nuts 17. The intermediate sections of said rods are curved so that they are substantially parallel to wires 11 and are therefore concentric to the cylinder 2. It will be seen that these reinforcing rods 16, pass through the bar 10 and are fastened by clips 19 which are carried by the rod 20. These reinforcing rods are constructed of heavier material than the wires 11, and tend to greatly strengthen the entire grate.

In order to assist in the separation of the grain from the straw, and also to guide the separated grain so that it will fall within a limited space, a series of deflecting plates 18 are positioned on the grate wires 11 and the reinforcing rods 16 at spaced intervals. These plates 18 extend transversely across the entire grate and are held in their spaced relation by any suitable means. The preferable arrangement of these plates on the wires 11, is to provide them with a number of perforations adjacent their upper edge, through which these wires pass.

From the above description, it will be seen that the grain which separates from the straw has practically an unobstructed flight as far as the grate is concerned, but that the deflecting plates 18 tend to guide the flying grain downwardly and rearwardly. The separating or deflecting plates are so arranged that the lower or bottom edge of each successive plate extends below the centrifugal line of flight of the grain that passes over the preceding plate, so that substantially all the separated grain strikes against some of these plates and is therefore prevented from scattering or being carried on to the straw deck 11'. However, in case some of the grain is carried on to the deck, another deflecting plate is placed intermediate the two ends thereof and tends to guide the separated grain downwardly and rearwardly into a suitable grain pan.

I claim:—

1. In a device of the character described, the combination with a threshing cylinder, a rigid concave therefor, of a separator grate, arranged concentrically to a section of the threshing cylinder, comprising a series of separate resilient parallel wires, a plurality of deflecting plates carried by said wires, and means for adjusting the entire separator grate relative to the threshing cylinder.

2. In combination with a threshing cylinder, of a separating grate, concentric to a section thereof, comprising a rigid head, a plurality of separate resilient wires detachably secured thereto, a rigid bar, secured to said wires, intermediate their ends, and means directly secured to said bar, for flexing the wires and thereby adjusting the grate relative to the threshing cylinder.

3. In combination with a threshing cylinder of a separating grate, comprising a plurality of resilient wires located below and curved concentrically to said cylinder and secured in position by rigid bars, a series of brace rods parallel to the resilient wires and detachably secured to the rigid bars, substantially as set forth.

4. In combination with a threshing cylinder, of a separating grate comprising a plurality of resilient wires located below and curved concentrically to said cylinder, a transverse bar constructed and arranged to engage said wires, and means for adjusting said bar to flex the resilient wires, whereby the space between the cylinder and grate may be varied.

The foregoing specification signed at St. Charles, Minn., this 11th day of April, 1910.

NICHOLAS COLGEN.

In presence of two witnesses:
DAVID GOODRICH,
JOHN REILAND.